(12) United States Patent
Mochizuki (10) Patent No.: US 9,170,447 B2
(45) Date of Patent: Oct. 27, 2015

(54) LCD ASSEMBLY STRUCTURE OF METER FOR AUTOMOBILE

(71) Applicant: YAZAKI CORPORATION, Minato-ku, Tokyo (JP)

(72) Inventor: Yasufumi Mochizuki, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 51 days.

(21) Appl. No.: 14/218,105

(22) Filed: Mar. 18, 2014

(65) Prior Publication Data
US 2014/0267976 A1 Sep. 18, 2014

(30) Foreign Application Priority Data
Mar. 15, 2013 (JP) .................................. 2013-053878

(51) Int. Cl.
*G02F 1/1333* (2006.01)
*B60K 37/00* (2006.01)

(52) U.S. Cl.
CPC .......... *G02F 1/133308* (2013.01); *B60K 37/00* (2013.01); *G02F 2001/133314* (2013.01)

(58) Field of Classification Search
CPC .............................................. G02F 1/133308
See application file for complete search history.

(56) References Cited

U.S. PATENT DOCUMENTS

2015/0168765 A1* 6/2015 Yu ..................... G02F 1/133308

FOREIGN PATENT DOCUMENTS

| JP | 2002-4087 A | 1/2002 |
| JP | 2005-338601 A | 12/2005 |
| JP | 2008-505292 | 9/2008 |
| JP | 2012-027185 A | 2/2012 |

* cited by examiner

*Primary Examiner* — Timothy L Rude
(74) *Attorney, Agent, or Firm* — Sughrue Mion, PLLC (57) ABSTRACT

An LCD assembly structure of a meter for automobile includes a liquid crystal plate; a liquid-crystal plate accommodating recess formed in a liquid crystal holder; a bottom-wall elastic pressing piece configured to bias a back surface of the liquid crystal plate from the bottom wall in a direction of separation; corner fixing pieces configured to extend outward parallel to a front surface of the liquid crystal holder at a pair of corners adjoining the liquid-crystal plate accommodating recess, and abut against a front surface of the liquid crystal plate; extension pieces configured to extend outward parallel to the holder front surface of the liquid crystal holder at a pair of corners opposite to the corner fixing pieces, and abut against the front surface of the liquid crystal plate; and first elastic pressing pieces configured to press and bias one edge face of the liquid crystal plate toward the extension pieces.

3 Claims, 7 Drawing Sheets

LCD ASSEMBLY STRUCTURE OF METER FOR AUTOMOBILE

CROSS-REFERENCE TO RELATED APPLICATIONS

The present application claims priority to and incorporates by reference the entire contents of Japanese Patent Application No. 2013-053878 filed in Japan on Mar. 15, 2013.

BACKGROUND OF THE INVENTION

1. Field of the Invention

The present invention relates to an LCD assembly structure of a meter for automobile.

2. Description of the Related Art

There are times when a meter for automobile has a liquid crystal plate (LCD) installed therein for the purpose of displaying a variety of information such as the running distance (for example, see JIII Journal of Technical Disclosure No. 2008-505292 and Japanese Patent Application Laid-open No. 2012-27185).

Figure 6:
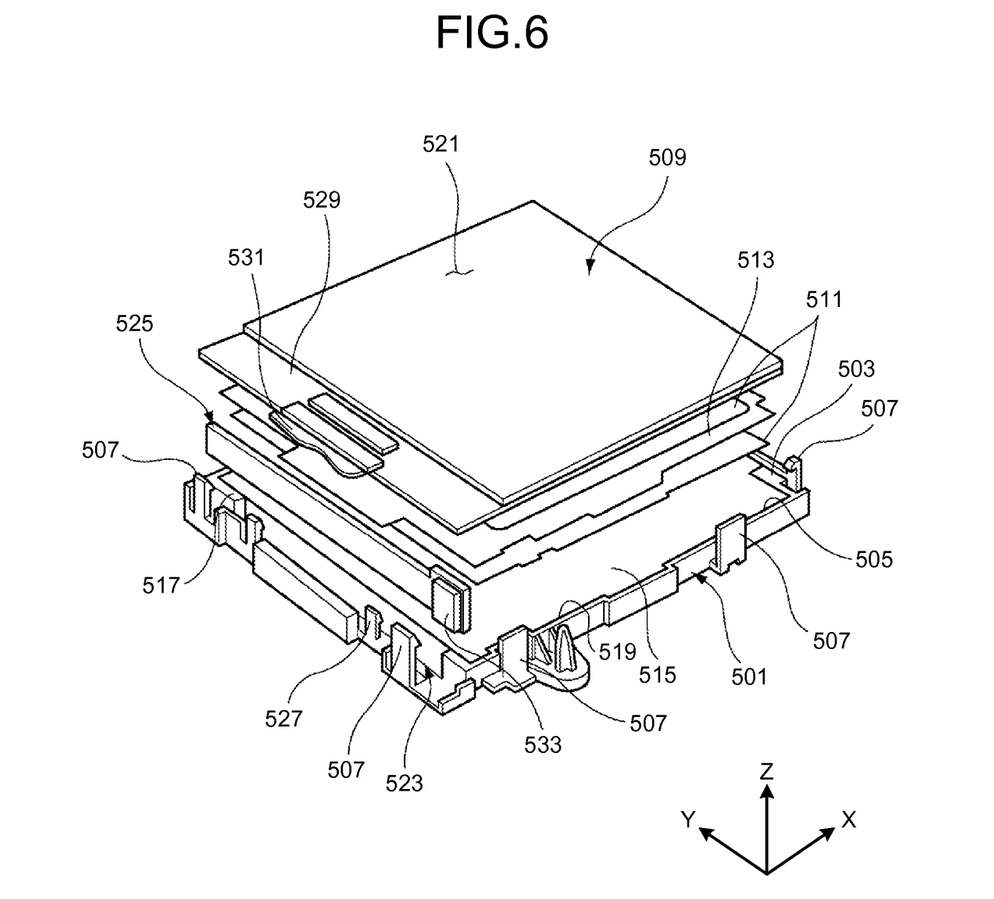
FIG. 6 is a perspective view of a conventional LCD assembly structure.

As illustrated in FIG. 6, in a conventional liquid crystal holder 501, a liquid-crystal plate accommodating recess 503 is formed. On a peripheral wall 505 of the liquid-crystal plate accommodating recess 503, a plurality of elastic locking nails 507 are disposed in a protruding manner. A liquid crystal plate 509 has a brightness enhancement film (BEF) 511, a black rim seal member 513, and a light guiding plate 515 disposed on the undersurface side in a laminated manner; and is integrated into the liquid-crystal plate accommodating recess 503. Upon being integrated, the liquid crystal plate 509 is positioned using an X-direction positioning unit 517 and a Y-direction positioning unit 519. The elastic locking nails 507 are used to lock a liquid crystal plate front surface 521. Because of that, the movement of the liquid crystal plate 509 is locked in the direction of rising from the liquid crystal holder 501. In the liquid crystal holder 501, a wiring board housing space 523 is formed. A wiring board 525 is housed in the wiring board housing space 523 and is fixed using wiring board fixing nails 527. The liquid crystal plate 509 includes a base portion 529, and a flat cable (FPC) 531 is connected to the base portion 529. The flat cable 531 is connected to the wiring board 525, as well as is connected to a wiring board connector 533 via the circuitry of the wiring board 525.

Figure 7:
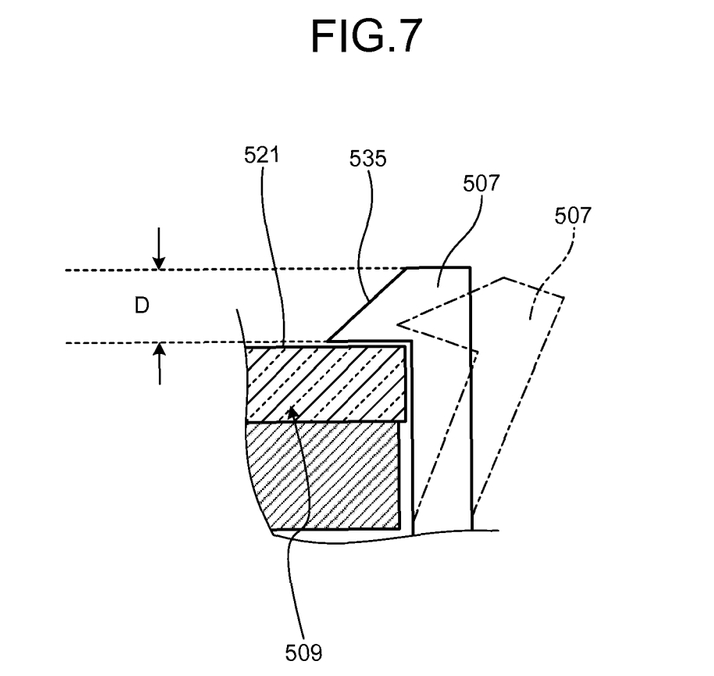
FIG. 7 is an enlarged cross-sectional view of elastic locking nails illustrated in FIG. 6.

In the abovementioned conventional LCD assembly structure of a meter for automobile, in order to prevent the rising of the liquid crystal plate 509 from the liquid-crystal plate accommodating recess 503, the elastic locking nails 507 are used. Hence, as illustrated in FIG. 7, there is a limitation on the extent of reducing a fixed-portion protruding dimension D on the upper side of the liquid crystal plate front surface 521. As far as the elastic locking nails 507 are concerned, nail portions 535 go on becoming thinner toward the leading ends. For that reason, if the fixed-portion protruding dimension D is reduced, there occurs a decline in the locking strength thereby leading to a decrease in the reliability of the fixing structure. Moreover, during the assembly of the liquid crystal plate 509, the nail portions 535 need to temporarily withdraw to the outside of the outer shape of the liquid crystal plate 509. In order to make it happen, it is necessary to provide a bending space on the back surface side opposite to the nail portions 535.

Thus, in the conventional LCD assembly structure in which the elastic locking nails 507 are used, it is necessary to provide the height dimension for the purpose of fixing the liquid crystal plate 509 and to provide a bending space for the purpose of holding the elastic locking nails 507. That is, it is necessary to provide a certain amount of assembly space that is larger than the outer shape of the liquid crystal plate 509.

SUMMARY OF THE INVENTION

It is an object of the present invention to at least partially solve the problems in the conventional technology.

According to first aspect of the present invention, an LCD assembly structure of a meter for automobile includes a liquid crystal plate having a square shape; a liquid-crystal plate accommodating recess having a square shape substantially similar to the shape of the liquid crystal plate, formed in a liquid crystal holder, and configured to accommodate the liquid crystal plate therein; a bottom-wall elastic pressing piece disposed in a protruding manner on a bottom wall of the liquid-crystal plate accommodating recess, and configured to bias a back surface of the liquid crystal plate from the bottom wall in a direction of separation; corner fixing pieces configured to extend outward parallel to a holder front surface of the liquid crystal holder at a pair of corners adjoining the liquid-crystal plate accommodating recess, and abut against a front surface of the liquid crystal plate; extension pieces configured to extend outward parallel to the holder front surface of the liquid crystal holder at a pair of corners opposite to the corner fixing pieces, and abut against the front surface of the liquid crystal plate; and first elastic pressing pieces disposed in between a pair of the corner fixing pieces, and configured to press and bias one edge face of the liquid crystal plate toward the extension pieces.

According to the configuration of the LCD assembly structure of a meter for automobile described above in the first aspect of the present invention, when an insertion-side edge portion of the liquid crystal plate is inserted on the lower side of the corner fixing pieces that are disposed at the pair of corners adjoining the liquid-crystal plate accommodating recess, the insertion-side edge portion abuts against the first elastic pressing pieces that are disposed in between the pair of corner fixing pieces. While the insertion-side edge portion remains abutted against the first elastic pressing pieces, when the liquid crystal plate is further pressed so as to elastically deform the first elastic pressing pieces, then a near-side edge portion lies at a position exceeding the leading ends of the pair of extension pieces. In that state, when the near-side edge portion is pressed in the direction approaching the bottom wall, the bottom-wall elastic pressing pieces disposed on the bottom wall get pressed. With that, the front surface of the liquid crystal plate gets placed on the lower side than the extension pieces. When there is a decrease in the pressing force in the direction of causing elastic deformation of the first elastic pressing pieces, the liquid crystal plate is pushed backward in the direction of the extension pieces due to the elastic restoring force of the first elastic pressing pieces. Then, the near-side edge portion gets placed on the undersurface side of the extension pieces. As a result, the liquid crystal plate is pressed and biased in the direction in which the back surface of the liquid crystal plate rises from the bottom wall due to the bottom-wall elastic pressing pieces, and the four corners of the front surface of the liquid crystal plate are held down by the corner fixing pieces and the extension pieces. With that, the liquid crystal plate is fixed in a sandwiched manner in the liquid-crystal plate accommodating recess.

In this way, because of the pressing operation performed in one direction, the liquid crystal plate can be easily assembled in the liquid crystal holder. Moreover, the liquid crystal plate is elastically sandwiched in the thickness direction by the corner fixing pieces and the extension pieces and by the bottom-wall elastic pressing pieces that are present on the lower side. Furthermore, the liquid crystal plate is elastically sandwiched in the direction along the front surface between the first elastic pressing pieces and the extension pieces. As a result, the liquid crystal plate is reliably fixed without any backlash. Besides, the outward extension parallel to the holder front surface is formed to be relatively long and the locking strength is secured. Hence, as compared to the nail portions of elastic locking nails in the conventional configuration, the corner fixing pieces and the extension pieces can be formed to have a smaller thickness. For that reason, the protrusion height of the liquid crystal plate from the front surface can be held down to a small amount. Moreover, unlike the nail portions of the elastic locking nails in the conventional configuration, the first elastic pressing pieces need not have nail portions. Hence, it is not necessary to provide a large bending space that enables temporary withdrawal of the leading ends of the nail portions to the outside of the outer shape of the liquid crystal plate. As a result, it becomes possible to minimize the assembly space.

According to second aspect of the present invention, in the LCD assembly structure of a meter for automobile, on one sandwiched edge of a pair of sandwiched edges that are sandwiched between a corner-fixing-piece-side edge having a pair of the corner fixing pieces disposed thereon and an extension-piece-side edge having a pair of the extension pieces disposed thereon, abutting bosses are disposed that abut against an edge face of the liquid crystal plate, and on the other sandwiched edge of the pair of sandwiched edges, second elastic pressing pieces are disposed that press and abut the liquid crystal plate toward the abutting bosses.

According to the configuration of the LCD assembly structure of a meter for automobile described above in the second aspect of the present invention, while assembling the liquid crystal plate in the liquid-crystal plate accommodating recess, when the insertion-side edge portion is inserted on the lower side of the corner fixing pieces and when the bottom-wall elastic pressing pieces are pressed, the second elastic pressing pieces are bent outward and the liquid crystal plate gets pushed. When the near-side edge portion is placed on the undersurface side of the extension pieces, the liquid crystal plate is pressed against the abutting bosses due to the elastic restoring force of the second elastic pressing pieces. As a result, due to the direction of sandwiching attributed to the first elastic pressing pieces and the extension pieces and due to the direction of sandwiching that is orthogonal to the abovementioned direction of sandwiching and that is attributed to the second elastic pressing pieces and the abutting bosses, the liquid crystal plate is reliably fixed without any backlash in the direction along the front surface. Moreover, unlike the nail portions of the elastic locking nails in the conventional configuration, the second elastic pressing pieces need not have nail portions. Hence, it is not necessary to provide a large bending space that enables temporary withdrawal of the leading ends of the nail portions to the outside of the outer shape of the liquid crystal plate. As a result, it becomes possible to minimize the assembly space.

According to third aspect of the present invention, in the LCD assembly structure of a meter for automobile, at erected leading ends of the second elastic pressing pieces, pressing tapered surfaces are formed that go on decreasing in height toward the center of the liquid-crystal plate accommodating recess.

According to the configuration of the LCD assembly structure of a meter for automobile described above in the third aspect of the present invention, when the insertion-side edge portion is inserted on the lower side of the corner fixing pieces and when the bottom-wall elastic pressing pieces are pressed, the pressing tapered surfaces formed at the erected leading ends of the second elastic pressing pieces are pressed by the back surface of the liquid crystal plate. The second elastic pressing pieces that are pressed by the back surface of the liquid crystal plate bend outward due to a component force of the pressing force applied to the pressing tapered surfaces. Once the liquid crystal plate is integrated, the second elastic pressing pieces elastically restore to original state and the liquid crystal plate abuts against the abutting bosses. Thus, it becomes possible to easily assemble the liquid crystal plate without having to perform the task of separately bending the second elastic pressing pieces to the outside.

In this way, with the LCD assembly structure of a meter for automobile according to the present invention, not only the liquid crystal plate can be easily assembled without any backlash but also the assembly space can be reduced.

Given above is the brief explanation of the present invention. In addition, by reading through the following explanation of an illustrative embodiment (hereinafter, referred to as "embodiment") of the present invention with reference to the accompanying drawings, the details of the present invention would become clearer.

DETAILED DESCRIPTION OF THE PREFERRED EMBODIMENTS

An exemplary embodiment of the present invention is described below with reference to the accompanying drawings.

Figure 1:
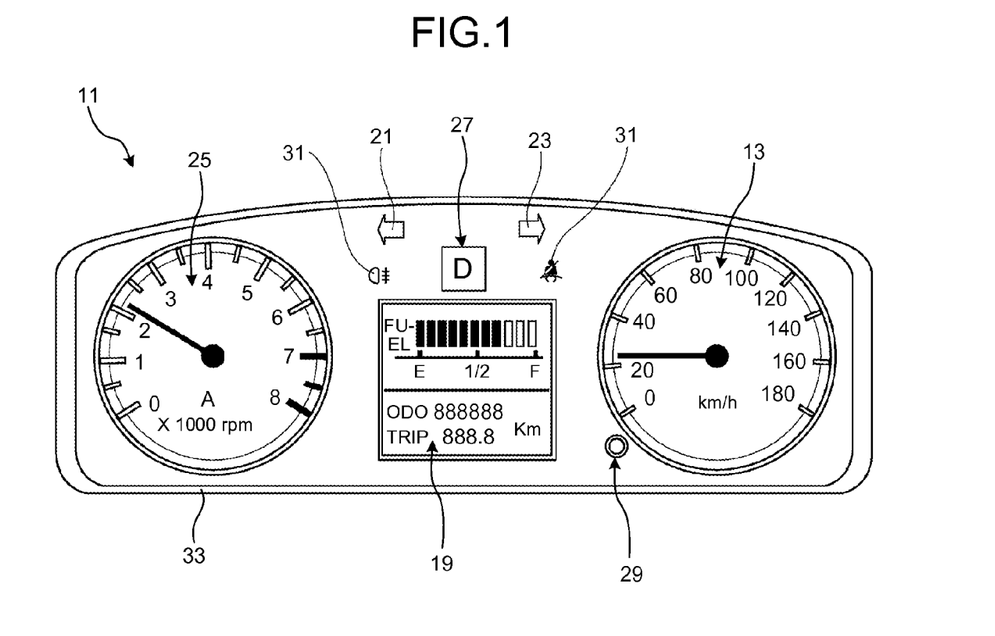
FIG. 1 is a front view of a meter for automobile that includes an LCD assembly structure according to an embodiment of the present invention.

As illustrated in FIG. 1, an LCD assembly structure according to the embodiment of the present invention can be suitably used in a combination meter 11 that is a meter for automobile. The combination meter 11 is attached to, for example, an installment panel (not illustrated) of a vehicle. As illustrated in FIG. 1, the combination meter 11 is equipped with a speedometer 13 that indicates the speed of the vehicle; a multiple display unit 19 such as a liquid crystal display (LCD) device 17 using a liquid crystal plate 15; a left turn display unit 21; a right turn display unit 23; a tachometer 25 that displays the number of revolutions of the engine; a shift indicator 27; a TRIP knob 29; and a warning lamp 31 used to indicate that the seatbelt is not fastened or to indicate that the headlamps are not turned OFF.

The speedometer 13, the multiple display unit 19, the left turn display unit 21, the right turn display unit 23, the tachometer 25, the shift indicator 27, and the TRIP knob 29 are accommodated in a meter case (not illustrated) of the combination meter 11. On the front surface of the meter case is attached a flap 33 that hides a wiring substrate and a drive unit accommodated in the meter case. Meanwhile, on the front surface side of the meter case is attached a front-side glass.

Figure 2:
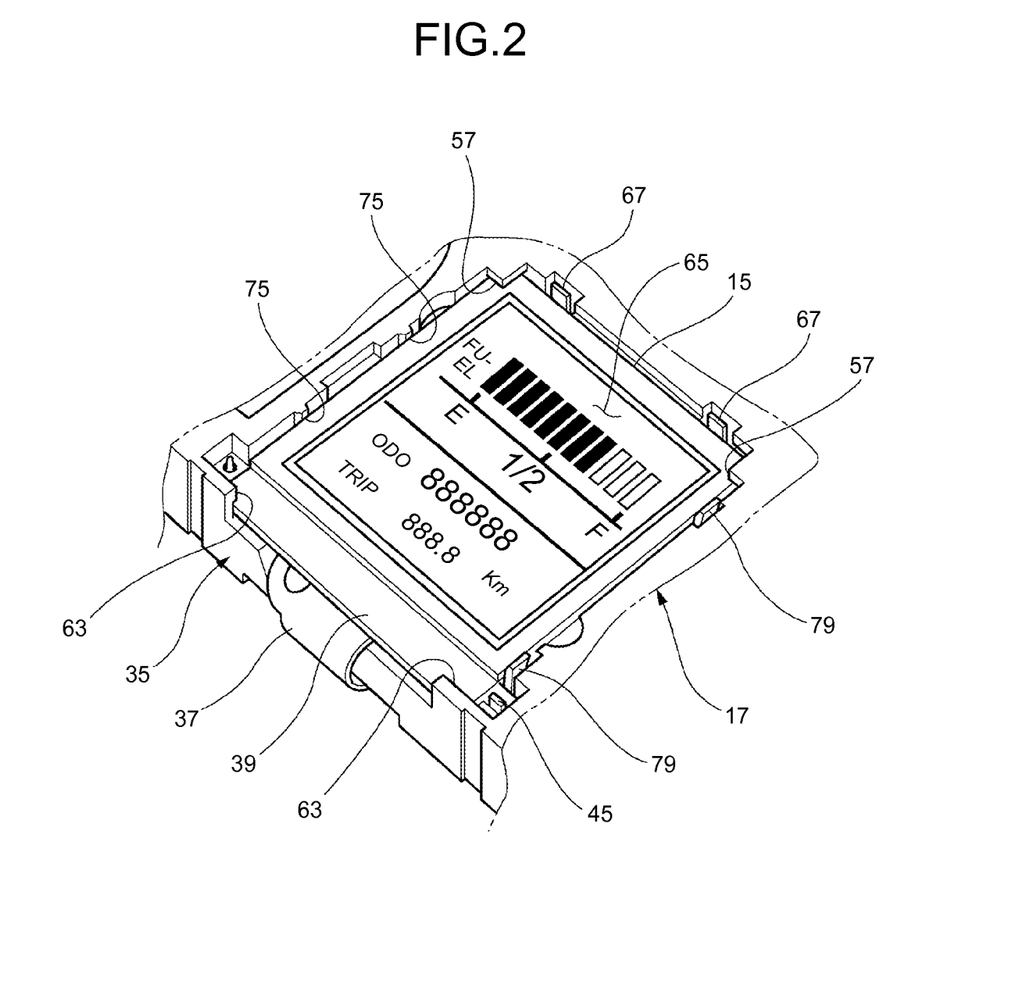
FIG. 2 is a perspective view of the main part in a state in which a liquid crystal display device illustrated in FIG. 1 is accommodated in a liquid crystal holder.

As illustrated in FIG. 2, the liquid crystal display device 17, which is the visible part of the multiple display unit 19, is accommodated in a liquid crystal holder 35 of the meter case. The liquid crystal holder 35 is integrally molded with the meter case using a synthetic resin material.

Figure 3:
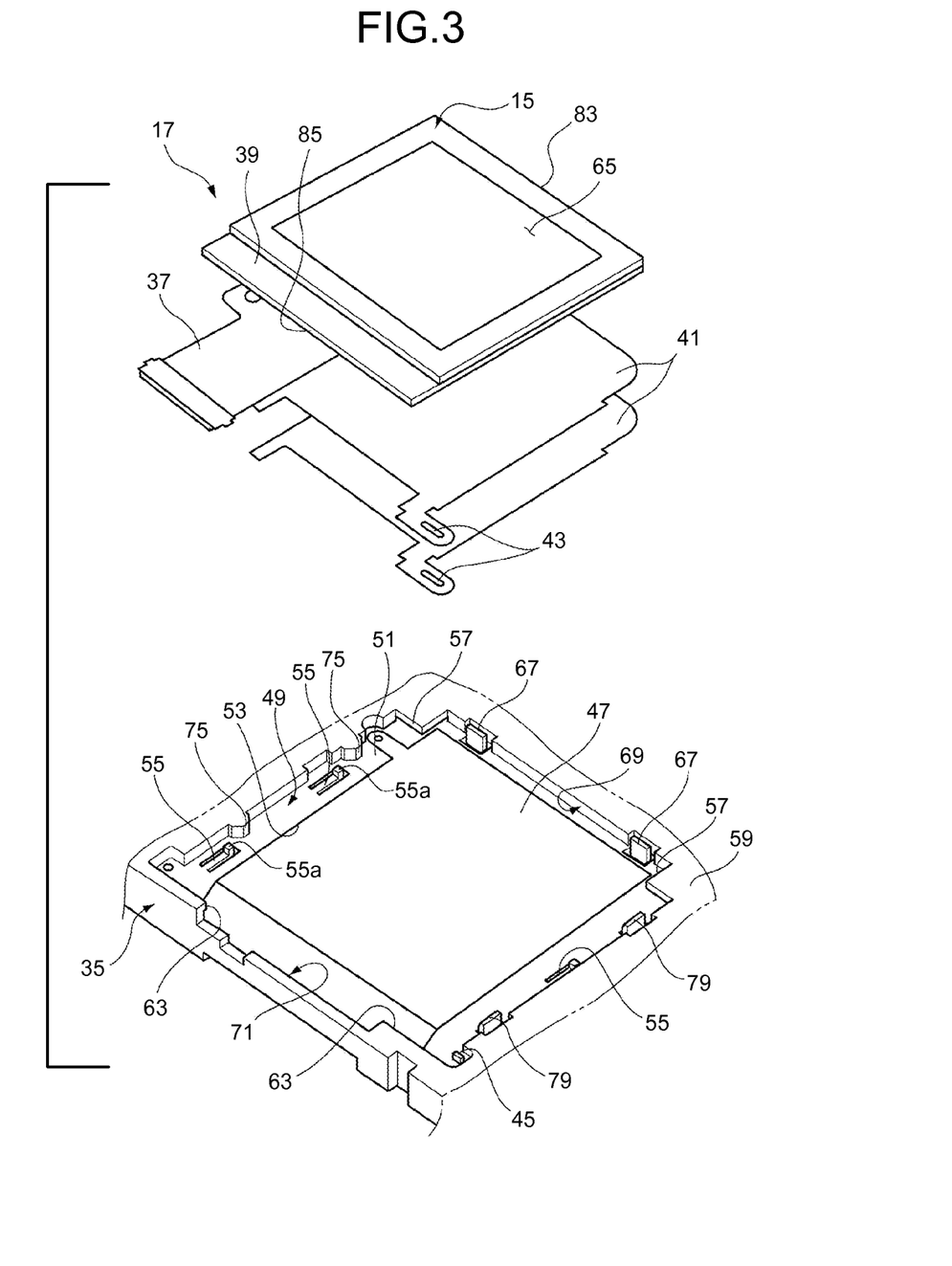
FIG. 3 is an exploded perspective view of the liquid crystal display device illustrated in FIG. 2.

As illustrated in FIG. 3, the liquid crystal plate 15 is formed in a square shape. From one side of the liquid crystal plate 15, a substrate portion 39 extends outward and has a flat cable (FPC) 37 connected thereto. On the undersurface of the liquid crystal plate 15, two brightness enhancement films (BEFs) 41 are placed in a laminated manner. Herein, mounting holes 43, which are formed on the margins of the brightness enhancement films 41, fit with a BEF mounting boss 45 disposed on the liquid crystal holder 35 so that the brightness enhancement films 41 are positioned and fixed. On a mounting surface on which the brightness enhancement films 41 are mounted, a prism sheet 47 that is put on a light guiding plate (not illustrated) is placed.

The liquid crystal holder 35 has a liquid-crystal plate accommodating recess 49 formed therein. The liquid-crystal plate accommodating recess 49 has a square shape substantially similar to the shape of the liquid crystal plate 15 and is used to accommodate the liquid crystal plate 15. Moreover, in the liquid-crystal plate accommodating recess 49, a recess 53 is formed on the center side of a bottom wall 51 for the purpose of housing the light guiding plate, the prism sheet 47, and the brightness enhancement films 41. That is, the bottom wall 51 is formed around the recess 53. On the bottom wall 51, at least the liquid crystal plate 15 is directly mounted. In addition to that, it is also possible to mount the brightness enhancement films 41 along with the liquid crystal plate 15 on the bottom wall 51.

On the bottom wall 51 of the liquid-crystal plate accommodating recess 49, bottom-wall elastic pressing pieces 55 are disposed in a protruding manner. The bottom-wall elastic pressing pieces 55 bias the liquid crystal plate 15 from the bottom wall 51 to the direction of separation (the direction of rising). In the present embodiment, three pieces of the bottom-wall elastic pressing pieces 55 are disposed along parallel two sides of the liquid-crystal plate accommodating recess 49. The bottom-wall elastic pressing pieces 55 are formed by cutting U-shaped notches on the bottom wall 51 so that salient portions 55a on the free end side protrude from the bottom wall 51.

At the pair of corners adjoining the liquid-crystal plate accommodating recess 49, corner fixing pieces 57 are formed, respectively that extend outward parallel to a holder front surface 59 of the liquid crystal holder 35 (in the present embodiment, extend outward in the same plane) and abut against a front surface 65 of the liquid crystal plate 15. In the present embodiment, the corner fixing pieces 57 are formed to have a quadrangular shape and are placed in square corner portions. As a result, triangle-shaped orthogonal two sides 61 protrude (see FIG. 4). As illustrated in FIG. 5A, the corner fixing pieces 57 along with the bottom-wall elastic pressing pieces 55 elastically sandwich the liquid crystal plate 15 from the front-back-surface direction (the thickness direction).

At the pair of corners opposite to the corner fixing pieces 57, extension pieces 63 are formed that extend outward parallel to the holder front surface 59 of the liquid crystal holder 35 (in the present embodiment, extend outward in the same plane) and abut against the front surface 65 of the liquid crystal plate 15. In the present embodiment, the extension pieces 63 are formed to have a greater thickness than the corner fixing pieces 57. Thus, the extension pieces 63 sandwich the substrate portion 39 that is thinner than the front surface 65 (see FIG. 5C).

The corner fixing pieces 57 and the liquid crystal plate 15 are formed to be as thin as possible under the condition that a sufficient fixing strength is obtained for achieving reliable control over the rising of the liquid crystal plate 15. The corner fixing pieces 57 are formed in such a size that a sufficient engagement allowance is achieved on the front surface 65 of the liquid crystal plate 15. Meanwhile, the extension pieces 63 are formed with the minimum engagement allowance that ensures a reliable engagement with respect to the front surface 65 of the liquid crystal plate 15 (more particularly, with respect to the substrate portion 39).

In between the pair of corner fixing pieces 57 are disposed first elastic pressing pieces 67. In the present embodiment, each first elastic pressing piece 67 is disposed in the vicinity of one corner fixing piece 57. The first elastic pressing pieces 67 are disposed in an erected manner from the bottom wall 51; and press an insertion-side edge portion 83, which is one of the edge faces of the liquid crystal plate 15, toward the extension pieces 63. Moreover, the leading ends of the first elastic pressing pieces 67 protrude up to a height that is equivalent to or lower than the height of the corner fixing pieces 57.

Figure 4:
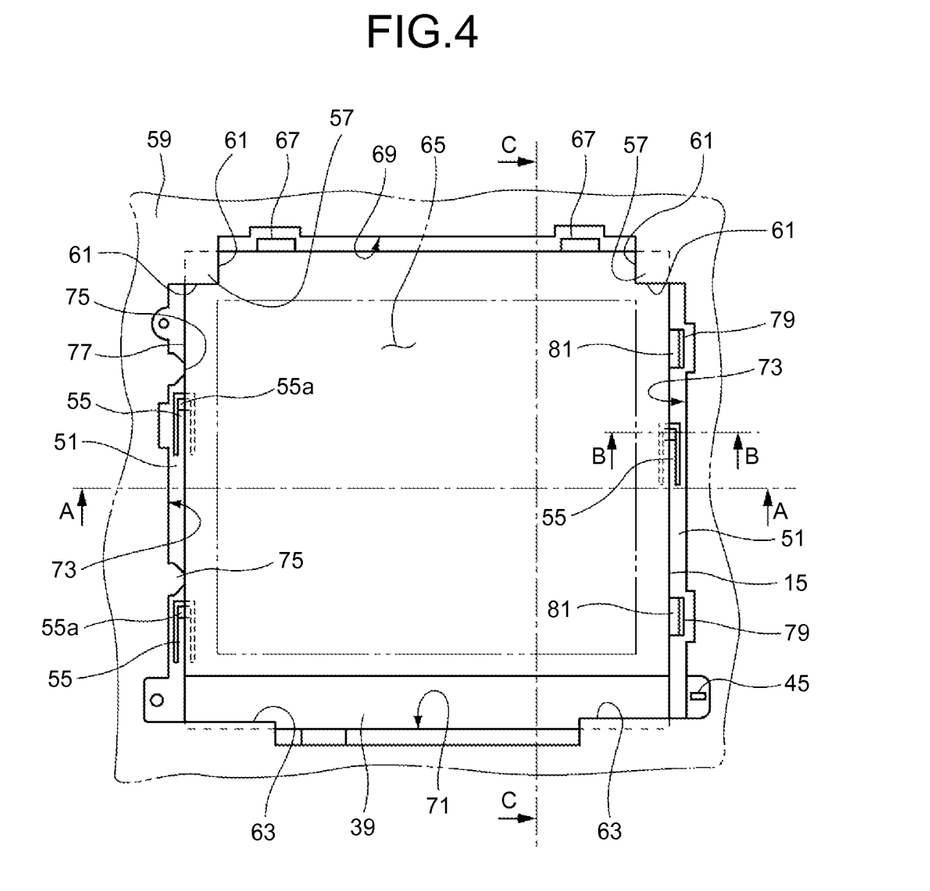
FIG. 4 is a planar view of the liquid crystal display device and the liquid crystal holder illustrated in FIG. 2.
Figure 5A:
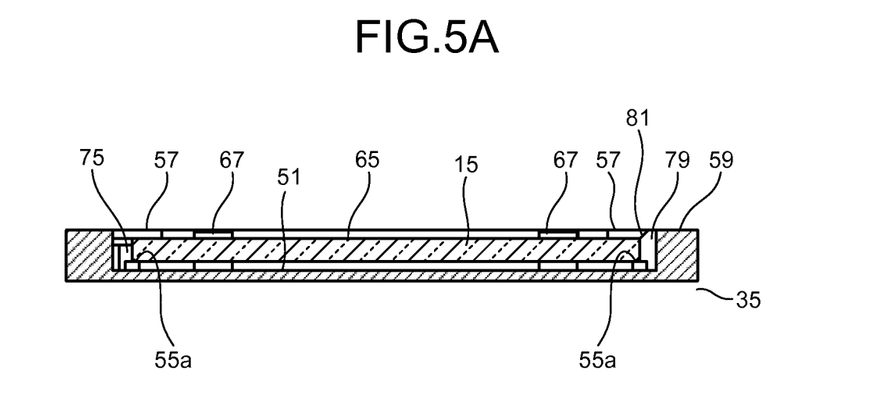
FIG. 5A is a cross-sectional view along line A-A illustrated in FIG. 4.

Of the liquid-crystal plate accommodating recess 49 that is quadrangular in shape, the side on which the pair of corner fixing pieces 57 is disposed serves as a corner-fixing-piece-side edge portion 69 (see FIG. 4). Moreover, the side on which the pair of extension pieces 63 is formed serves as an extension-piece-side edge portion 71. In the present embodiment, between the corner-fixing-piece-side edge portion 69 and the extension-piece-side edge portion 71 is sandwiched a pair of sandwiched sides 73. On one of the sandwiched sides 73 is disposed a pair of abutting bosses 75 that abuts against a liquid crystal plate edge face 77. That is, the pair of abutting bosses 75 serves as the bearing surface of the liquid crystal plate edge face 77. On the other of the sandwiched sides 73 are disposed second elastic pressing pieces 79 that are disposed in an erected manner from the bottom wall 51 and that press the liquid crystal plate 15 toward the abutting bosses 75. In the present embodiment, the second elastic pressing pieces 79 are disposed in a pair opposite to the abutting bosses 75.

In the present embodiment, at the erected leading ends of the second elastic pressing pieces 79, pressing tapered surfaces 81 are formed (see FIG. 5A) as inclined surfaces that go on decreasing in height toward the center of the liquid-crystal plate accommodating recess 49. During the assembly of the liquid crystal plate 15, the pressing tapered surfaces 81 make a sliding contact with the back surface of the liquid crystal plate 15. That is, during the assembly of the liquid crystal plate 15, when the backside surface of the liquid crystal plate 15 is pressed against the pressing tapered surfaces 81, the liquid crystal plate 15 can be assembled while bending the second elastic pressing pieces 79 to withdrawal positions.

Given below is the explanation of the mechanism of the LCD assembly structure that has the configuration described above.

In the LCD assembly structure according to the present embodiment, when the insertion-side edge portion 83 (see FIG. 3) of the liquid crystal plate 15 is inserted on the lower side of the pair of corner fixing pieces 57 that is present adjacent to the liquid-crystal plate accommodating recess 49, the insertion-side edge portion 83 abuts against the first elastic pressing pieces 67 that are disposed in between the pair of corner fixing pieces 57. While the insertion-side edge portion 83 remains abutted against the first elastic pressing pieces 67, when the liquid crystal plate 15 is further pressed so as to elastically deform the first elastic pressing pieces 67, then a near-side edge portion 85 (see FIG. 3) lies at a position exceeding the leading ends of the pair of extension pieces 63. In that state, when the near-side edge portion 85 is pressed in the direction approaching the bottom wall 51, the bottom-wall elastic pressing pieces 55 disposed on the bottom wall 51 get pressed. With that, the front surface 65 (more particularly, the substrate portion 39) of the liquid crystal plate 15 gets placed on the lower side than the extension pieces 63.

When there is a decrease in the pressing force in the direction of causing elastic deformation of the first elastic pressing pieces 67, the liquid crystal plate 15 is pushed backward in the direction of the extension pieces 63 due to the elastic restoring force of the first elastic pressing pieces 67. Then, as illustrated in FIG. 5C, the near-side edge portion 85 gets placed on the undersurface side of the extension pieces 63. As a result, the liquid crystal plate 15 is pressed and biased in the direction in which the back surface of the liquid crystal plate 15 rises from the bottom wall 51 due to the bottom-wall elastic pressing pieces 55, and the four corners of the front surface 65 of the liquid crystal plate 15 are held down by the corner fixing pieces 57 and the extension pieces 63. With that, the liquid crystal plate 15 is fixed in a sandwiched manner in the liquid-crystal plate accommodating recess 49.

Meanwhile, in order to detach the liquid crystal plate 15 from the liquid crystal holder 35, the liquid crystal plate 15 is pressed toward the first elastic pressing pieces 67. Consequently, the first elastic pressing pieces 67 that are pressed by the liquid crystal plate 15 bend outward, and the liquid crystal plate 15 moves in the direction of pressing. As a result, the near-side edge portion 85 of the liquid crystal plate 15 comes off from the leading end of the extension pieces 63. Once the near-side edge portion 85 comes off from the leading end of the extension pieces 63; the liquid crystal plate 15 moves upward, and the insertion-side edge portion 83 gets out of the corner fixing pieces 57. As a result, the liquid crystal plate 15 is detached from the liquid crystal holder 35.

In this way, because of the pressing operation performed in one direction, the liquid crystal plate 15 can be easily assembled in the liquid crystal holder 35. Moreover, the liquid crystal plate 15 is elastically sandwiched in the thickness direction by the corner fixing pieces 57 and the extension pieces 63 and by the bottom-wall elastic pressing pieces 55 that are present on the lower side. Furthermore, the liquid crystal plate 15 is elastically sandwiched in the direction along the front surface 65 between the first elastic pressing pieces 67 and the extension pieces 63. As a result, the liquid crystal plate 15 is reliably fixed without any backlash. Besides, the orthogonal two sides 61 that extend outward parallel to the holder front surface 59 are formed to be relatively long and the locking strength is secured. Hence, as compared to the nail portions 535 of the elastic locking nails 507 (see FIG. 7) in the conventional configuration, the corner fixing pieces 57 and the extension pieces 63 can be formed to have a smaller thickness. For that reason, the protrusion height of the liquid crystal plate 15 from the front surface 65 can be held down to a small amount.

Figure 5B:
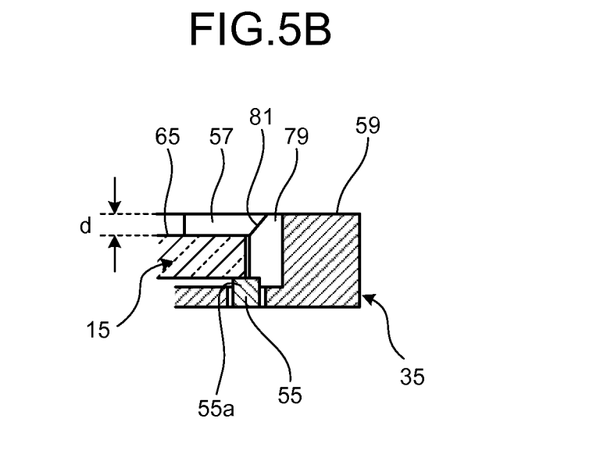
FIG. 5B is a cross-sectional view along line B-B illustrated in FIG. 4.
Figure 5C:
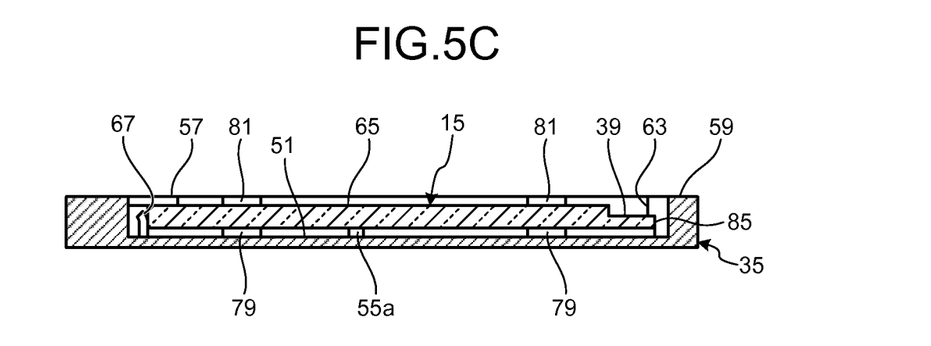
FIG. 5C is a cross-sectional view along line C-C illustrated in FIG. 4.

That is, as illustrated in FIG. 5B, as compared to the fixed-portion protruding dimension D attributed to the nail portions 535 of the elastic locking nails 507 in the conventional configuration (see FIG. 7), it becomes possible to have a smaller fixed-portion protruding dimension d, and to reduce the protruded height of the liquid crystal plate 15 from the front surface 65.

Moreover, unlike the nail portions 535 of the elastic locking nails 507 in the conventional configuration, the first elastic pressing pieces 67 need not have nail portions. Hence, it is not necessary to provide a large bending space that enables temporary withdrawal of the leading ends of the nail portions 535 to the outside of the outer shape of the liquid crystal plate 509. As a result, it becomes possible to minimize the assembly space. Hence, the liquid crystal display device 17 can be placed close to the other components.

Besides, in the LCD assembly structure according to the present embodiment, on one of the sandwiched sides 73 are disposed the abutting bosses 75, while on the other sandwiched side 73 are disposed the second elastic pressing pieces 79. Thus, while assembling the liquid crystal plate 15 in the liquid-crystal plate accommodating recess 49, when the insertion-side edge portion 83 is inserted on the lower side of the corner fixing pieces 57 and the bottom-wall elastic pressing pieces 55 are pressed, the second elastic pressing pieces 79 are bent outward and the liquid crystal plate 15 gets pushed. When the near-side edge portion 85 is placed on the undersurface side of the extension pieces 63, the liquid crystal plate 15 is pressed against the abutting bosses 75 due to the elastic restoring force of the second elastic pressing pieces 79. As a result, due to the direction of sandwiching attributed to the first elastic pressing pieces 67 and the extension pieces 63 and due to the direction of sandwiching that is orthogonal to the abovementioned direction of sandwiching and that is attributed to the second elastic pressing pieces 79 and the abutting bosses 75, the liquid crystal plate 15 is reliably fixed without any backlash in the direction along the front surface 65 of the liquid crystal plate 15. Moreover, unlike the nail portions 535 of the elastic locking nails 507 in the conventional configuration, the second elastic pressing pieces 79 need not have nail portions. Hence, it is not necessary to provide a large bending space that enables temporary withdrawal of the leading ends of the nail portions 535 to the outside of the outer shape of the liquid crystal plate 509. As a result, it becomes possible to minimize the assembly space.

Furthermore, in the LCD assembly structure according to the present embodiment, while pushing the liquid crystal plate 15, the pressing tapered surfaces 81 formed at the erected leading ends of the second elastic pressing pieces 79 are pressed by the back surface of the liquid crystal plate 15. The second elastic pressing pieces 79 that are pressed by the back surface of the liquid crystal plate 15 bend outward due to a component force of the pressing force applied to the pressing tapered surfaces 81. Once the liquid crystal plate 15 is integrated, the second elastic pressing pieces 79 elastically restore to original state and the liquid crystal plate 15 abuts against the abutting bosses 75. Thus, it becomes possible to easily assemble the liquid crystal plate 15 without having to perform the task of separately bending the second elastic pressing pieces 79 to the outside.

Meanwhile, the number of first elastic pressing pieces 67, the number of bottom-wall elastic pressing pieces 55, the number of abutting bosses 75, and the number of second elastic pressing pieces 79 are not limited to the embodiment described above. That is, those constituent elements can be increased or decreased in number in an arbitrary manner.

In this way, according to the LCD assembly structure of a meter for automobile according to the present embodiment, the liquid crystal plate 15 can be fixed, without any backlash, in the direction along the front surface 65 of the liquid crystal plate 15 and in the thickness direction of the liquid crystal plate 15 by performing an easy assembly task. Besides, not only the fixed-portion protruding dimension on the upper side of the front surface 65 of the liquid crystal plate 15 can be reduced, but also the bending space for the first elastic pressing pieces 67 and the second elastic pressing pieces 79 can be made smaller. That enables achieving minimization of the assembly space of the liquid crystal plate 15.

Meanwhile, the present invention is not limited to the embodiment described above and it is possible to implement various modifications and improvements within the scope of the invention. Besides, the material, the shape, the dimension, the number, and the arrangement location of each constituent element according to the embodiment described above can be set in an arbitrary manner within the scope of the invention.

What is claimed is:

1. An LCD assembly structure of a meter for automobile comprising:
    a liquid crystal plate having a square shape;
    a liquid-crystal plate accommodating recess having a square shape substantially similar to the shape of the liquid crystal plate, formed in a liquid crystal holder, and configured to accommodate the liquid crystal plate therein;
    a bottom-wall elastic pressing piece disposed in a protruding manner on a bottom wall of the liquid-crystal plate accommodating recess, and configured to bias a back surface of the liquid crystal plate from the bottom wall in a direction of separation;
    corner fixing pieces configured to extend outward parallel to a holder front surface of the liquid crystal holder at a pair of corners adjoining the liquid-crystal plate accommodating recess, and abut against a front surface of the liquid crystal plate;
    extension pieces configured to extend outward parallel to the holder front surface of the liquid crystal holder at a pair of corners opposite to the corner fixing pieces, and abut against the front surface of the liquid crystal plate; and
    first elastic pressing pieces disposed in between a pair of the corner fixing pieces, and configured to press and bias one edge face of the liquid crystal plate toward the extension pieces.

2. The LCD assembly structure of a meter for automobile according to claim 1, wherein
    on one sandwiched edge of a pair of sandwiched edges that are sandwiched between a corner-fixing-piece-side edge having a pair of the corner fixing pieces disposed thereon and an extension-piece-side edge having a pair of the extension pieces disposed thereon, abutting bosses are disposed that abut against an edge face of the liquid crystal plate, and
    on the other sandwiched edge of the pair of sandwiched edges, second elastic pressing pieces are disposed that press and abut the liquid crystal plate toward the abutting bosses.

3. The LCD assembly structure of a meter for automobile according to claim 2, wherein
    at erected leading ends of the second elastic pressing pieces, pressing tapered surfaces are formed that go on decreasing in height toward the center of the liquid-crystal plate accommodating recess.

* * * * *